Aug. 30, 1960   J. J. HAGOPIAN   2,950,672
PRINTING DIRECTORY
Filed Dec. 11, 1957   2 Sheets-Sheet 2
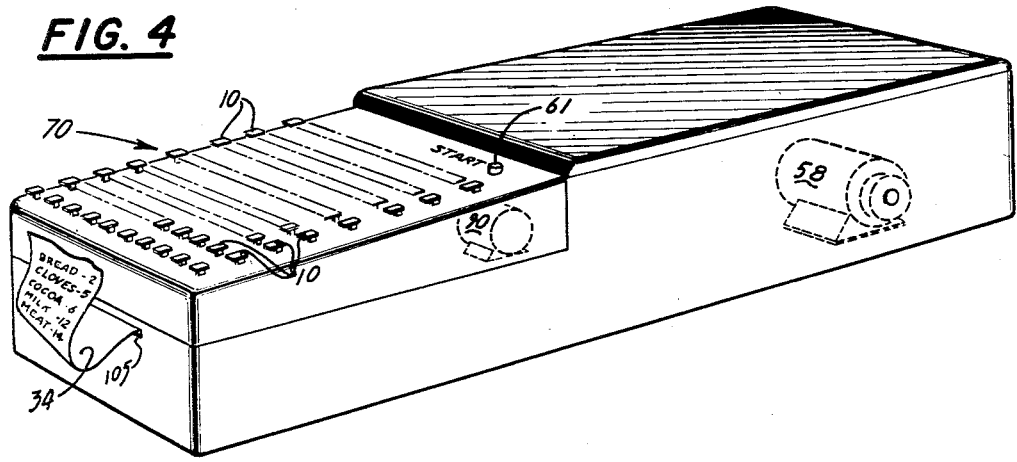
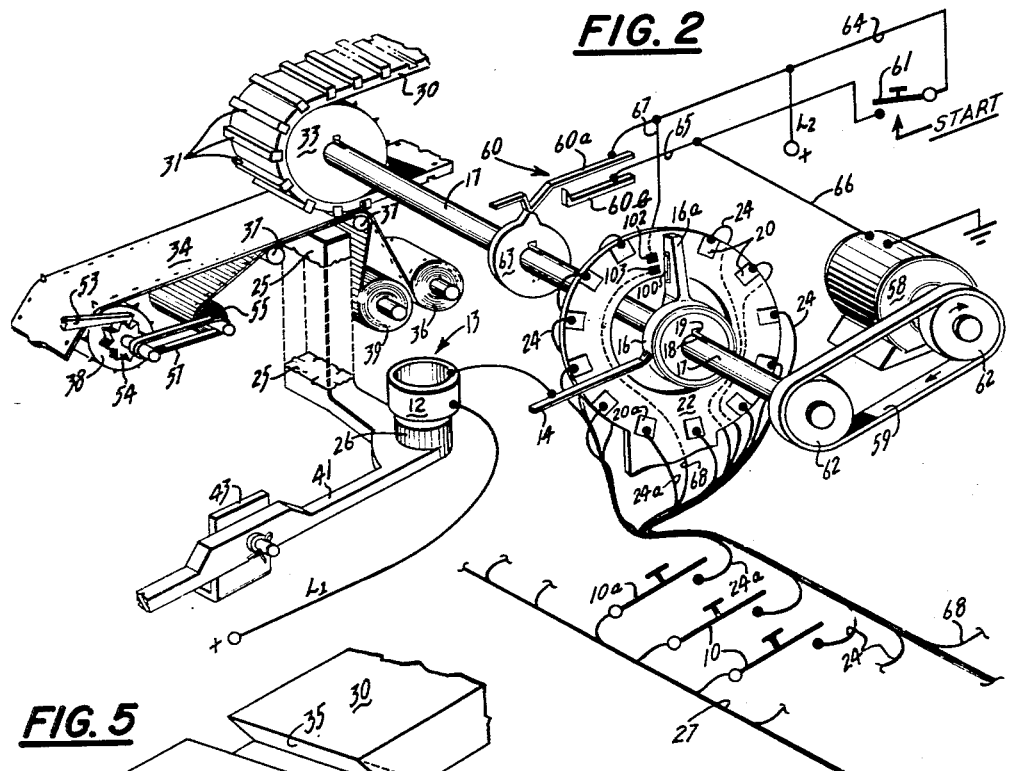
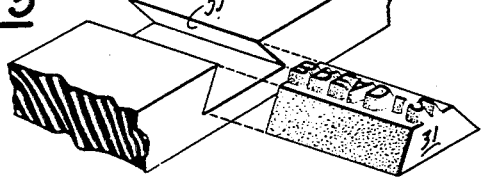

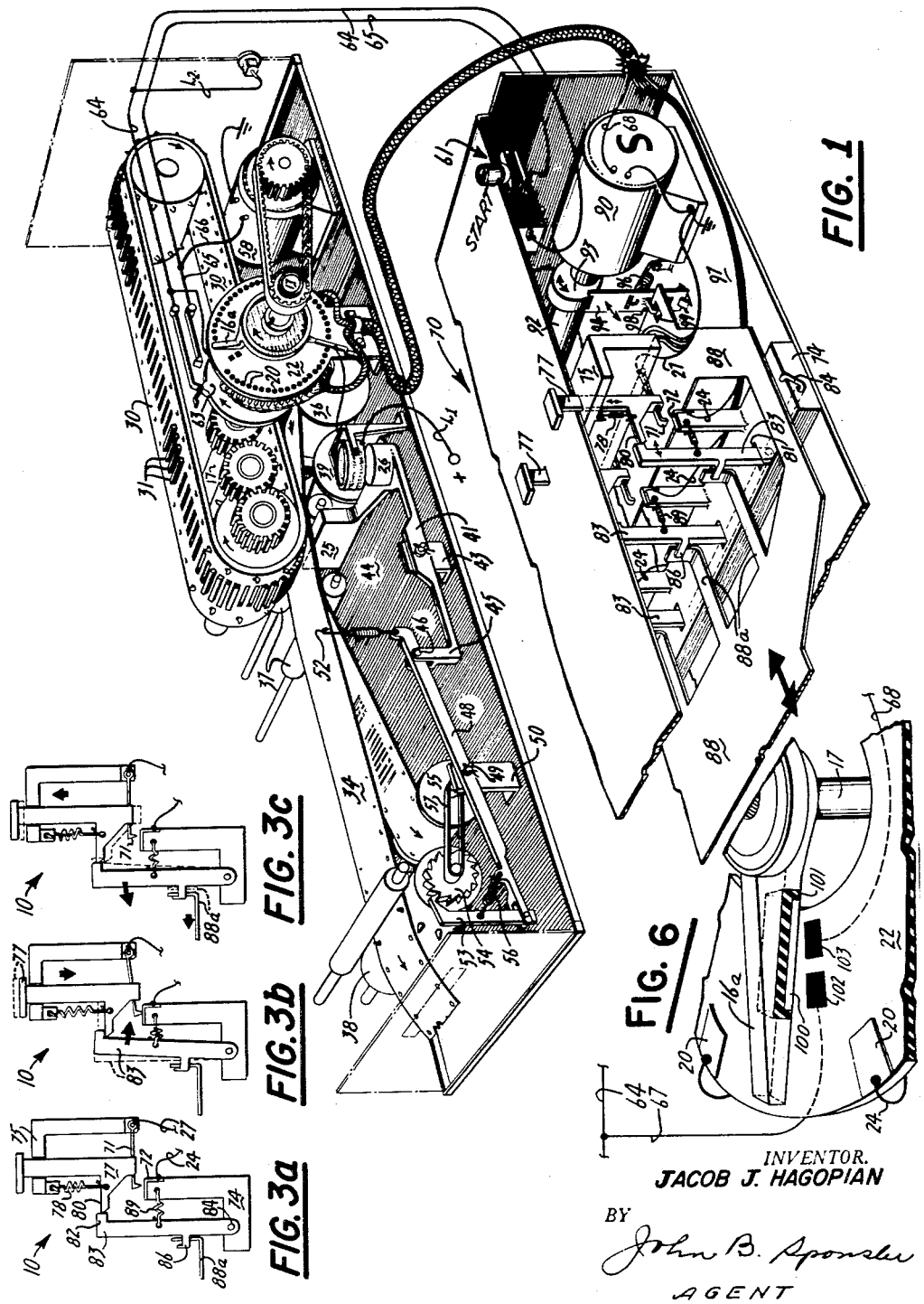

United States Patent Office 2,950,672
Patented Aug. 30, 1960

2,950,672

PRINTING DIRECTORY

Jacob J. Hagopian, Santa Clara County, Calif., assignor to International Business Machines Corporation, New York, N.Y., a corporation of New York Filed Dec. 11, 1957, Ser. No. 702,042

7 Claims. (Cl. 101—93)

This invention pertains to an inventory locating directory and more particularly to a printing directory for listing a random selection of inventory items in a predetermined sequence.

In the past, shoppers in supermarkets seeking the shelf location of items on their shopping lists have been required to search the store to locate the appropriate shelf for each item. This same problem is found in warehousing operations where a warehouseman is required to locate many items from inventory storage bins and shelves, etc. Under such circumstances, the present invention greatly facilitates locating such a list of items. This is done by converting any random selection of items into a printed sequential listing thereof, the sequence in which the items are printed corresponding to shelf or bin numbers, for example. Thus, the order in which items are written on an ordinary shopping list, as normally prepared by a customer, is rearranged and printed by this invention to correspond to the shelf numbers where the desired products are located.

Accordingly, it is an object of this invention to provide an inventory directory apparatus which lists a random selection of items in a predetermined sequence.

In order to enable small stores or warehouses to purchase such a directory, it is realized that such a machine must not be elaborate or particularly complicated. Therefore, it is another object of this invention to provide a machine of the type described which is relatively simple to build and maintain but which is thoroughly reliable.

According to the invention, a machine is provided having a keyboard and associated apparatus upon which inventory items are listed alphabetically or in any other desired manner. Shoppers operate the machine by depressing keys on the keyboard. Each depressed key corresponds to a product to be purchased. Then the shopper actuates a "start" button or switch and the machine of the invention prints the names of the selected items together with their shelf or counter number on a paper tape, these names appearing in chronological order by shelf number.

It is therefore another object of this invention to provide a printing directory for rearranging a shopping list in chronological order by shelf number.

Another feature of this invention is that the order in which the items are printed establishes a uniform flow of traffic through the store.

Other objects of the invention will be pointed out in the following description and claims and illustrated in the accompanying drawings which disclose, by way of example, the principle of the invention and the best mode which has been contemplated of applying that principle.

In the drawings:

Fig. 1 is a perspective view of the apparatus of the invention including a portion of its keyboard.

Fig. 2 is a schematic representation of the apparatus of Fig. 1.

Figs. 3a–3c show the operation of one of the keys on the keyboard of Fig. 1.

Fig. 4 is a perspective view of the outside cover of the invention showing a suggested relationship of the keyboard to the balance of the apparatus.

Fig. 5 is a perspective view of a portion of the printing carrier of Figs. 1 and 2.

Fig. 6 is an enlarged portion of the scanning commutator of Figs. 1 and 2.

Referring to the drawings and particularly to Fig. 1, the apparatus of the invention is thereshown comprising means for effecting the functions of storing a random selection of items, scanning the selections thus made, and printing the selected product names and shelf numbers in a predetermined order. The specific apparatus employed will be described in complete detail below.

Fig. 2 represents schematically the apparatus of Fig. 1 and shows an electromechanical arrangement for first selectively establishing a number of electrical circuits and then sequentially energizing each one to effect printing. A plurality of switches 10 are provided. Each switch 10 corresponds to a separate inventory item. Switches 10 are of the mechanical latch type which remain closed, once depressed, until reset. However, numerous equivalent switches may be used which provide the foregoing function. Closing one of switches 10, such as 10a, establishes an electrical circuit which is traced from power line $L_1$, through the winding 12 of an electromagnet 13, a brush 14 in contact with a rotor 16. Rotor 16 is insulated from and mounted on a driven shaft 17 and secured thereto by a key 18 in keyway 19. Rotor 16 is provided with an arm 16a which makes electrical connection with a series of contacts 20 formed on a fixed commutator plate 22 made of insulating material. Contacts 20 are all insulated from one another and each leads via associated wires 24 to one of switches 10. In the example, contact 20a leads to switch 10a via wire 24a and then to ground via wire 27. Thus, as shaft 17 turns, rotor arm 16a scans all contacts 20. Whenever a switch 10 has been closed, arm 16a will complete that circuit energizing printing magnet 13.

The printing associated with each closed switch, i.e., selected item, is provided by a type carrier 30 having print slugs 31 secured thereon. This may be done in any suitable manner, as shown in Fig. 5, such as by employing a wedge-shaped slot 35 in carrier 30 and a matching wedge-shaped slug 31 so that slug 31 is keyed into slot 35 from the side of carrier 30. In this manner slugs 31 are readily interchangeable to accommodate changes in inventory. Each slug 31 carries the name of a product plus its shelf number. Carrier 30 is driven by a sprocket 33 connected to shaft 17.

Referring to Fig. 1, this connection of shaft 17 to sprocket 33 is effected by using a pair of gears 28 with an idler gear 29 interposed therebetween. For simplicity, this gearing has been omitted in the schematic of Fig. 2. Below sprocket 33 (and carrier 30 as it passes therearound) is a print hammer 25 which is an extension of the armature 26 of magnet 13. Energizing magnet 13 drives hammer 25 toward carrier 30 as it travels around sprocket 33. Sprocket 33 thus acts as a platen for hammer 25.

Paper and an inking medium such as carbon paper are fed in the following manner between hammer 25 and slugs 31. A paper tape 34 is led by guide rollers 37 from a supply roll 36 between carrier 30 and hammer 25 to a feed sprocket roller 38. A roll 39 of carbon paper 40 is also guided over rollers 37. The carbon paper 40 passes face up between hammer 25 and tape 34 so that printing is effected whenever magnet 13 is energized. Thus, by closing a selected switch 10, a corresponding slug 31 will print upon tape 34 when arm 16a reaches its associated contact 20. The sequence of slugs 31 on carrier 30 is in chronological order of shelf numbers so that printing will be effected in that order as arm 16a scans contacts 20. In this arrangement, there is one slug 31 for each contact 20. This 1:1 ratio of slugs 31 to contacts 20 has been omitted from the drawings for reasons of clarity.

The escapement mechanism for stepping tape 34 and carbon paper 40 in line spacing increments during strokes of hammer 25 is shown in Fig. 1. Armature 26 of electromagnet 13 is provided with a lever arm extension 41 pivotally connected to a bracket 43 secured to the floor 44 of the machine. The left end of extension 41 has a forked elbow 45 with a pin 46 therethrough coupling extension 41 to a lever 48. Lever 48 is pivoted on a pin 49 secured to a fixed bracket 50.

The right-hand end of lever 48 is biased upwardly by a spring 52 secured to a fixed portion (not shown) of the machine. The left end of lever 48 is also forked and mounts a pawl 53 pivotally therebetween. Pawl 53 engages a ratchet 54 secured to roller 38. A spring 56 fastened to pawl 53 and lever 48 provides sufficient tension to keep pawl 53 properly engaged with ratchet 54.

Therefore, the upward movement of armature 26 when actuated, advances pawl 53 upwardly one notch on ratchet 54. The deenergizing of winding 12 caused by insulated gaps between contacts 20 allows spring 52 to pull pawl 53 downwardly thereby advancing roller 38 one increment. Thus, between printing strokes of hammer 25 (i.e., during its downward movement) tape 34 is advanced, whereas when hammer 25 is moving upwardly to stroke the carbon paper 40, tape 34 is stopped. Carbon paper 40 is simultaneously advanced with tape 34 by coupling its take-up roll 55 to feed roller 38 by a belt 57 trained around the respective shafts of roll 55 and roller 38.

Referring again to Fig. 2, shaft 17 is belt driven by a motor 58 via pulleys 62 and belt 59. Motor 58 is arranged to operate for one cycle at a time and then stop. This is accomplished by employing a cam operated switch 60 in parallel with a starting switch 61. The contacts 60a and 60b of switch 60 are spring urged together by making the upper contact 60a of a suitable spring material. A cam 63 for operating switch 60 is keyed to shaft 17 and is shaped to open switch 60 at the end of each cycle of operation and to hold it open until shaft 17 stops. At the beginning of each cycle, with switch 60 held open by cam 63, motor 59 is operated by momentarily closing switch 61. This completes a circuit which may be traced from power line L$_2$, via wire 64, switch 61, wires 65 and 66 to motor 58 and thence to ground.

Having closed switch 61, motor 58 rotates shaft 17 and cam 63 thereby allowing contact 60a to close upon contact 60b. This completes a circuit from L$_2$, via wire 64, switch 60, wires 65 and 66 to motor 58, thereby effectively by-passing switch 61 so that motor 58 will continue to run, although switch 61 is reopened, until cam 63 opens switch 60 by lifting contact 60a from 60b.

The structure and operation of the keyboard 70, the exterior of which is shown in Fig. 4, is shown in detail in Figs. 1 and 3 and comprises a multiplicity of latch type switches or keys generally designated 10 in Figs. 1 and 3 to correspond with switches 10 in the schematic diagram of Fig. 2. Keys 10 are best shown in Fig. 3, Fig. 3a showing the open condition and Fig. 3b the closed and latched condition thereof. Fig. 3c shows how keys 10 are reset to their open condition.

Referring to Figs. 3a–3c, each key 10 is comprised of a contact arm 71 and a contact plate 72, both being insulated from their supporting structure, for connecting wires 24 to wire 27. Plate 72 is secured on top of a fixed lower frame member 74 and arm 71 is pivotally attached to a fixed upper frame member 75. In order to drive arm 71 downward into contact with plate 72 a depresser member 77 is attached to the distal end of arm 71. Depresser 77 extends up through keyboard 70 and is free to move downwardly against the tension of a spring 78 secured to member 75 and depresser 77. Depresser 77 is provided with a lip 80 for engaging a projecting tip 82 at the distal end of a hinged latch 83. Latch 83 rests in a recess 81 and is hinged thereat by a movable pin 84 which passes through member 74, recess 81 and a hole in the proximal end of latch 83. Latch 83 is formed with a short extension 86 located intermediate of its ends and bent normal to the length of latch 83. Extension 86 is engaged by an upwardly bent bail finger 88a of a bail 88 (see Fig. 1). Latch 83 is spring urged to the right in Fig. 3 by a latch spring 89 connected to latch 83 and member 74.

In operation, it can be seen (in Fig. 3a) that depresser 77 is restrained upwardly by spring 78, thereby holding arm 71 out of contact with plate 72 and thus keeping switch 10 open. Depressing key 10 (as in Fig. 3b) closes arm 71 onto plate 72 thereby electrically connecting wires 24 and 27. Key 10 remains in this condition since the downward movement of lip 80 allowed the tip 82 of latch 83 to move over it under the biasing force of spring 89. In this condition, key 10 is held closed until bail 88 is driven leftward as shown in Fig. 3c which allows depresser 77 to carry arm 71 up and away from plate 72.

In order to restore all keys 10 thereby opening all selection circuits after every cycle of operation, reset apparatus is provided comprising a rotary solenoid 90 operable when energized to drive a shaft 92 one-half a revolution and when deenergized to reset shaft 92 to its initial position. A cam 93 is mounted on shaft 92 for controlling a cam follower level 94 which operates bail 88. Lever 94 is pivoted at its base and forked at its free end to maintain its alignment with cam 93. Lever 94 is held against cam 93 by a spring 96 attached to the base 97 of the keyboard and to lever 94. A hook 98, integral with lever 94 engages bail 88 through an opening 99 therein. As described below, cam 93 is rotated one-half revolution at the end of each scanning cycle. Rotation of cam 93 forces bail 88 to the left carrying all latches 83 with it. This opens all keys 10 as explained above. After each actuation of cam 93, solenoid 90 is deenergized and resets shaft 92 to its starting position. Bail 88 is thus returned to the right under the biasing force of spring 96.

The means for controlling solenoid 90 is best shown in Fig. 6 comprising a contact bar 100 embedded in arm 16a but electrically isolated therefrom by a layer of insulation 101. A pair of closely spaced conductive contacts 102 and 103 are fixed to plate 22 and disposed in the path of bar 100 defined by rotation of arm 16a. At the end of each cycle, bar 100 slides over contacts 102 and 103 thereby connecting wire 67 to solenoid 90 via wire 68. Thus, a resetting of keys 10 occurs at the end of each cycle of the machine's operation. This is occasioned by the arrival of arm 16a at contacts 102 and 103 which energizes the circuit traced along line L$_2$, wires 64 and 67, contact 102, bar 100, contact 103, wire 68, motor 58 and finally to ground via wire 69.

In operation, the machine of the invention functions in the following manner. A customer seeking the location of a number of items depresses several keys 10 on keyboard 70. Having made his selections, he then depresses start button 61 which bypasses open switch 60. This energizes motor 58. Motor 58 drives rotor 16 to scan all contacts 20. The initial movement of shaft 17 closes switch 60 thus allowing start button 61 to be released without interrupting the operation of motor 58. Arm 16a completes all circuits established by previously selected keys 10 as it sequentially passes contacts 20. For each established circuit completed via arm 16a hammer 25 will print an associated item name and shelf number upon tape 34. At the end of each cycle, after rotor 16 has scanned all contacts 20, bar 100 of arm 16a completes a circuit which initiates a resetting of all keys 10 in order to condition the apapratus for a new cycle of operation. The cycle having been completed, the customer will pull tape 34 out of slot 105 in the outer cover of the machine. The portion of tape 34 bearing the sequentially printed list is then torn off and carried with the customer as he completes his shopping.

While there have been shown and described and pointed out the fundamental novel features of the invention as applied to the preferred embodiment, it will be understood that various omissions and substitutions and changes in the form and detials of the device illustrated and in its operation may be made by those skilled in the art, without departing from the spirit of the invention. It is the intention, therefore, to be limited only as indicated by the scope of the following claims.

What is claimed is:

1. An inventory locating directory comprising printing means including a plurality of cyclically arranged type slugs disposed in prearranged order, storage means for storing a random selection of a plurality of predetermined inquiries, said storage means including a plurality of inquiry storage units selectively settable to establish either a first or a second condition, said second condition representing the selection of an inquiry, each said slug corresponding to one said inquiry, control means operatively coupled to said printing means and responsive to those of said storage units set to their said second condition to print in said prearranged order those of said slugs which correspond to said selection, and means for resetting all said units to their said first condition at the end of a complete printing cycle, whereby said random selection of inquiries is printed in a rearranged order corresponding to the sequence of said slugs.

2. An inventory locating directory comprising printing means including a plurality of cyclically arranged type slugs disposed in a prearranged order and an electrically activated printing member, means for storing a random selection of a plurality of predetermined inquiries, each said slug corresponding to one said inquiry, control means operatively coupled to said printing member and connected to said storage means so as to print in said prearranged order those of said slugs which correspond to said selection, and means for limiting the operation of said printing means to a single cycle, whereby said random selection of inquiries is printed in a rearranged order corresponding to the sequence of said slugs.

3. An inventory locating directory comprising printing means including a plurality of type slugs arranged for cyclic travel in a prearranged order and an electromagnetically actuated print hammer, storage means for storing a random selection of a plurality of predetermined inquiries, said storage means including a plurality of switches selectively settable between an open and closed condition, said closed condition representing the selection of inquiry, each said slug corresponding to one said inquiry, control means operatively connected to said hammer and operably coupled to said switches so as to print in said prearranged order those of said slugs which correspond to said selection, means for limiting the operation of said printing means to a single cycle, and means for resetting all said switches to their open condition at the end of a complete printing cycle, whereby said random selection of inquiries is printed in a rearranged order corresponding to the sequence of said slugs.

4. An inventory locating directory comprising a cyclically arranged type carrier having a plurality of type slugs thereon in a prearranged order, each slug bearing the name and location of an inventory item, a print hammer coacting with said slugs on said carrier, means for feeding paper and an inking medium between said hammer and said carrier, means for actuating said hammer to effect printing by said slugs upon said paper, a plurality of latching switches for controlling said actuating means, each of said switches corresponding to one of said slugs, a commutator having a plurality of electrically isolated contacts, each of said contacts being connected to a separate one of said switches, scanning means for connecting said switches sequentially to said actuating means via said contacts, means for coupling said scanning means and said carrier in phase to place each slug in printing position opposite said hammer when said scanning means is connecting the associated switch for said placed slug to said actuating means, and means for driving said coupling means to effect printing under control of said switches by said slugs in their preselected order 5. An inventory locating directory comprising a cyclically arranged type carrier having a plurality of type slugs thereon in a prearranged order, each slug bearing the name and location of an inventory item, a print hammer coacting with said slugs on said carrier, means for feeding paper and an inking medium between said hammer and said carrier, means for actuating said hammer to effect printing by said slugs upon said paper, a plurality of latching switches for controlling said actuating means, each of said switches corresponding to one of said slugs, a commutator having a plurality of electrically isolated contacts, each of said contacts being connected to a separate one of said switches, scanning means for connecting said switches sequentially to said actuating means via said contacts, means for coupling said scanning means and said carrier in phase to place each sulg in printing position opposite said hammer when said scanning means is connecting the associated switch for said placed slug to said actuating means, means for driving said coupling means to effect printing under control of said switches by said slugs in their preselected order, and means for opening all of said switches at the end of a scanning cycle.

6. An inventory locating directory comprising a cyclically arranged type carrier having a plurality of type slugs thereon in a prearranged order, each slug bearing the name and location of an inventory item, a print hammer coacting with said slugs on said carrier, means for feeding paper and an inking medium between said hammer and said carrier, means for actuating said hammer to effect printing by said slugs upon said paper, a plurality of latching switches for controlling said actuating means, each of said switches corresponding to one of said slugs, a commutator having a plurality of electrically isolated contacts, each of said contacts being connected to a separate one of said switches, scanning means for connecting said switches sequentially to said actuating means via said contacts, means for coupling said scanning means and said carrier in phase to place each slug in printing position opposite said hammer when said scanning means is connecting the associated switch for said placed slug to said actuating means, means for driving said coupling means to effect printing under control of said switches by said slugs in their preselected order, and means for limiting the operation of said driving means to one scanning cycle at a time.

7. An inventory locating directory comprising a cyclically arranged type carrier having a plurality of type slugs thereon in a prearranged order, each slug bearing the name and location of an inventory item, a print hammer coacting with said slugs on said carrier, means for feeding paper and an inking medium between said hammer and said carrier, means for actuating said hammer to effect printing by said slugs upon said paper, a plurality of latching switches for controlling said actuating means, each of said switches corresponding to one of said slugs, a commutator having a plurality of electrically isolated contacts, each of said contacts being connected to a separate one of said switches, scanning means for connecting said switches sequentially to said actuating means via said contacts, means for coupling said scanning means and said carrier in phase to place each slug in printing position opposite said hammer when said scanning means is connecting the associated switch for said placed slug to said actuating means, means for driving said coupling means to effect printing under control of said switches by said slugs in their preselected order, means for opening all of said switches at the end of a scanning cycle, and means for limiting the operation of said driving means to one scanning cycle at a time.

References Cited in the file of this patent

UNITED STATES PATENTS

| | | |
|---|---|---|
| 1,282,211 | Fulk | Oct. 22, 1919 |
| 1,649,021 | De Minico | Nov. 15, 1927 |
| 1,981,987 | Bryce | Nov. 27, 1934 |
| 2,379,862 | Bush | July 10, 1945 |
| 2,478,277 | Keen | Aug. 9, 1949 |
| 2,668,870 | Ridler | Feb. 9, 1954 |
| 2,702,380 | Brustman | Feb. 15, 1955 |
| 2,737,883 | Crawford | Mar. 13, 1956 |
| 2,776,618 | Hartley | Jan. 8, 1957 |
| 2,814,031 | Davis | Nov. 19, 1957 |
| 2,814,984 | Sanderson | Dec. 3, 1957 |
| 2,822,752 | Bradshaw | Feb. 11, 1958 |